United States Patent [19]
Reichenbach

[11] 3,988,091
[45] Oct. 26, 1976

[54] OIL SEAL MANUFACTURING APPARATUS AND METHOD

[75] Inventor: Jerry D. Reichenbach, Carpentersville, Ill.

[73] Assignee: Chicago Rawhide Manufacturing Company, Elgin, Ill.

[22] Filed: Jan. 13, 1975

[21] Appl. No.: 540,427

[52] U.S. Cl. .......................... 425/125; 425/DIG. 47
[51] Int. Cl.² .................. B29H 3/042; B29H 3/06; B29C 1/00
[58] Field of Search .......... 425/117, 125, 127, 128, 425/129, 123, DIG. 44, DIG. 47; 264/259, 267, 268

[56] References Cited
UNITED STATES PATENTS

| | | | |
|---|---|---|---|
| 3,004,298 | 10/1961 | Haynie | 425/DIG. 47 |
| 3,241,193 | 3/1966 | Pohlman | 425/DIG. 47 |

Primary Examiner—Francis S. Husar
Assistant Examiner—Robert J. Charvat
Attorney, Agent, or Firm—James T. FitzGibbon

[57] ABSTRACT

An apparatus for manufacturing fluid seals, which includes first and second mold parts movable along a given axis between open and closed positions. One mold part has a radially extending mold surface adapted to receive and support one surface of the flange portion of an insert to which a molded part of the seal is to be bonded, and the other mold part has a portion adapted to engage an opposite surface of the flange to hold the flange against the receiving and supporting mold surface to prevent leakage of fluid material from said cavity along the flange. One mold part includes at least one upper frusto-conical surface adapted to form one surface of the primary lip of the seal, a second seal body-forming surface of generally cylindrical form lying beneath the upper surface and joined thereto by a smooth transition portion, a lower frusto-conical surface tapering inwardly and downwardly and defining one surface of a second seal lip spaced axially from the primary lip, and an insert centering ring spaced downwardly apart from said cylindrical surface. The centering ring has a rounded nose portion of slightly greater diameter than the diameter of the cylindrical surface, and a wall surface extending downwardly and outwardly from the nose portion. The largest diameter of the centering ring is just smaller than the inside diameter of the flange of said insert. In use, when the insert is allowed to fall freely into said mold, it is centered by successive contact between its inside diameter and said first tapered surface, said cylindrical surface, and said centering ring wall surface.

4 Claims, 4 Drawing Figures

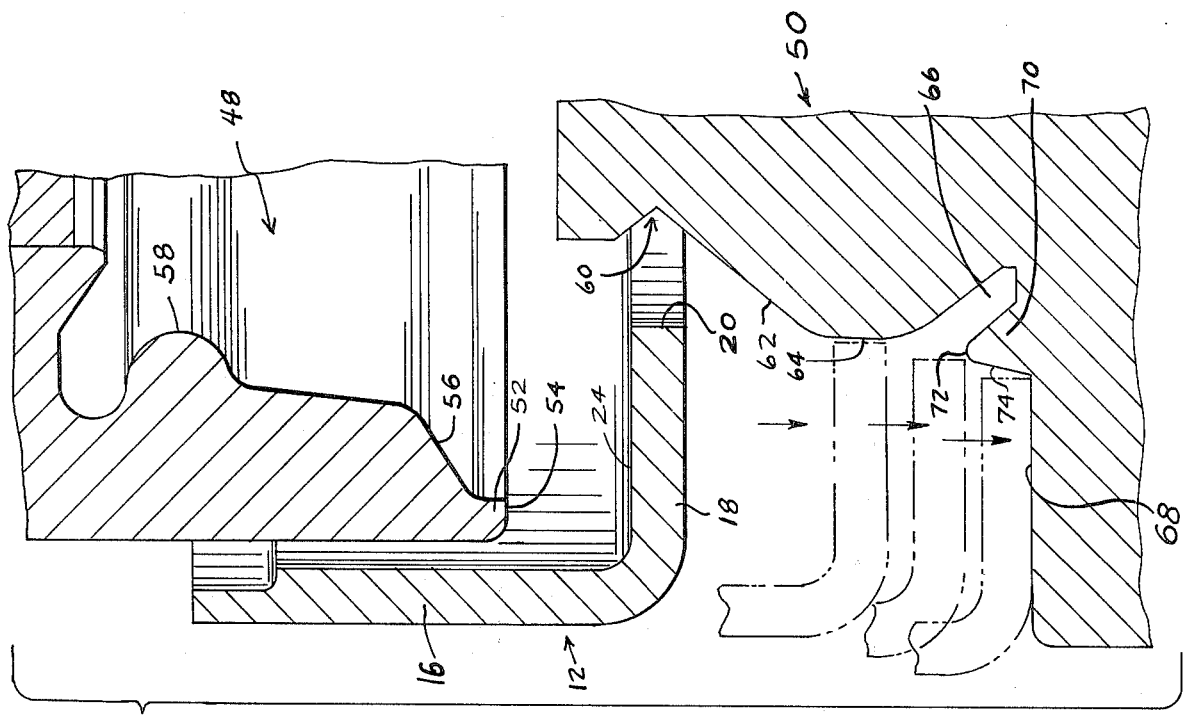
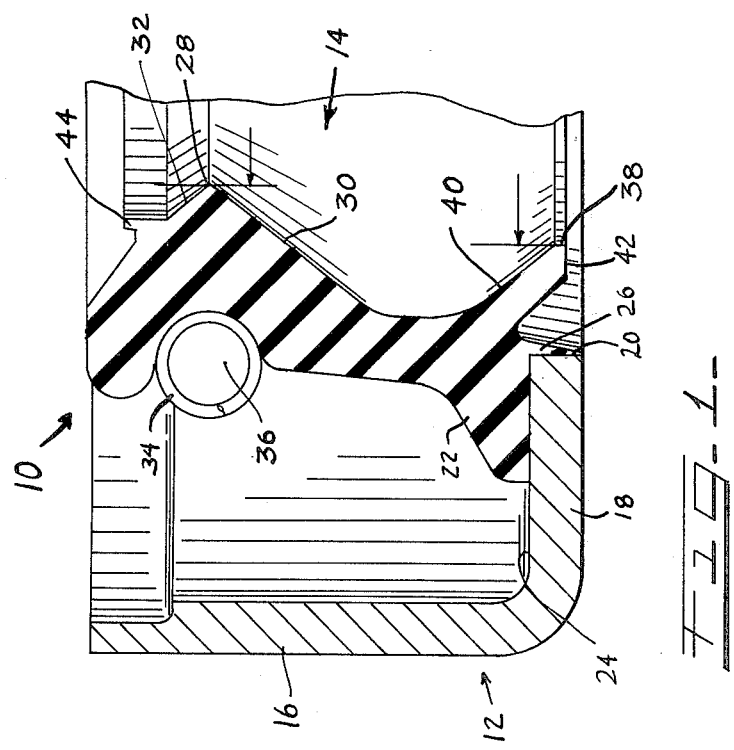

OIL SEAL MANUFACTURING APPARATUS AND METHOD

The present invention relates generally to molding methods and apparatus, and more particularly, to so-called isert molding of composite articles such as oil seals or other rubber-and-metal articles. By "insert molding" is meant molding of an article which includes a molded portion and another portion which has been disposed completely or partially into the mold and thus forms an "insert." In the present case, the insert is the metal part which is normally a stamping having both an axial and radial flange.

Oil seals are a typical example of a product which commonly requires a relatively rigid casing portion and also a relatively resilient seal body portion. The resilient body, which customarily includes one or more sealing lips is, according to current practices, bonded to one flange of a metal casing which is formed by stamping, and which usually forms the outside diameter and the oil seal.

Oil seals currently made in the United States are made to exacting standards, and are designed to last almost indefinitely in a number of applications. Typically, insert molded seals are used to seal rotary motion, such as crankshafts, transmissions, wheel bearings, drive axle pinions, etc. Seals of this type also commonly are used to seal sliding motion, such as that encountered in rod wiper applications, including hydraulic piston and cylinders, and are used in other telescoping mechanisms.

Seals of the above types normally include so-called primary sealing lip, in which a seal band is formed on the sealed part at the junction of two frusto-conical surfaces. In use, the oil or other fluid to be sealed remains on one side of the seal band and air or another fluid to be excluded lies on the other side thereof. The interface between the seal band itself and the shaft, rod, or other sealed part is lubricated by a thin film of oil, grease, or other sealed medium.

In a number of applications, a second or so-called "dirt lip" or "excluder lip" is also provided. This lip lies to the outside of the sealed region and, because it runs with less lubrication, or in some cases, no lubrication at all, the seal usually fits about the shaft with a reduced radial force or load. The function of the dirt lip is to exclude dirt from the immediate area of the primary lip, and especially to keep the area near the primary lip free from particulate matter of large dimensions, such as sand, grit, filings, or other abrasive material. Such seals are therefore used in a number of applications where the sealed mechanism works in a dirty environment, and there is therefore a need for a reliable apparatus for making seals of this type.

One problem of common occurrence in the shaft seal molding industry is the location of the metal stamping or other rigid casing part with relation to the remainder of the mold parts during molding of the article. There has been a need for reliable means for locating the casing in its desired position in the mold, which would serve both to provide relatively exact centering thereof and which would also prevent shifting during the molding, so as to eliminate the possibility of forming the seal opening in an off center relation to the outside of the casing. Depending upon the seal size and other factors, misalignment of only a few thousandths of an inch, for example, 0.003 to 0.010 can be tolerated, with a misalignment in this respect of not more than 0.005 being preferable.

In the past, there have been two ways of insuring such centering, one involving so-called centering plates which engage those portions of the seal casing lying outside the molding cavity, and methods and apparatus utilizing so-called "center register," i.e., the utilization of the inside diameter of the seal casing as the reference point from which the seal is located or centered.

Unfortunately, the latter method, while theoretically attractive, has not been widely successful in practice, particularly in those cases where a second or auxiliary lip, such as a dirt lip, has been required. One principal reason for using center register molding where possible, is that in common practice, for every seal having a given inside diameter, there are often several different outside diameters. Thus, a seal having a central opening sized to accommodate a 1 inch (1.00 inch) shaft might have an outside diameter (O.D.) in one of several sizes, such as 1.750, 1.875, 2.0, etc. Accordingly, for every molding cavity of a given size, an additional set of centering plates must be provided for each different O.D. size. Because a certain amount of deformation of the casing O.D. takes place where seals are formed by a method involving initial center register and subsequent deformation of the inside diameter (I.D.) of the metal stamping during molding, such methods are not entirely desirable. Other prior art suggestions for solving casing centering problems have been capable of improvement in one or more additional respects.

In view of the foregoing and other disadvantages of prior art methods and apparatus, it is an object of the present invention to provide an improved molding apparatus and method.

Another object is to provide an apparatus for making oil seals and other insert molded parts in which the metal or other casing material is located within the mold by reason of engagement thereof with mold parts lying within the molding cavity.

Another object is to provide a molding apparatus which has means for centering a seal casing as the casing is being positioned for mold closing and wherein passages are provided to permit elastomeric material to flow into the dirt lip forming area.

Still another object is to provide a mold apparatus having a first area with guiding surfaces thereon for aligning an insert part as it is moved toward a position of registry, and a second, spaced apart alignment ring adapted to engage and maintain the insert in a further aligned position during molding.

Another object is to provide a seal mold having both tapered and generally cylindrical surfaces adapted to engage and initially align the annular stamping used in seal molding, and having further, spaced apart means for engaging the inner stamping surfaces, with the second means having a reduced diameter nose portion and a slightly enlarged base portion for insuring final insert positioning within the mold.

Another object is to provide a molding method for insert molding seals and other articles and which includes approximately centering the stamping by engagement between a mold part and the inside stamping diameter, and which subsequently includes finally aligning the stamping and positioning it in a more exactly centered relation before closing the mold and forming a part therein.

Another object is to provide a method of center register molding which does not involve measurable deformation of the inside diameter of the stamping before, during or after mold closure.

Another object is to provide a method of center register molding which is effective to mold seals having auxiliary or dirt lips lying near the plane of the radial flange of the seal casing.

The foregoing and other objects and advantages are achieved in practice by providing a seal molding apparatus which includes an inner portion adapted to form the lips of the seal member and which includes tapered and frusto-conical surface adapted to initially engage a part of the inside casing diameter, a generally cylindrical surface forming a continuation thereof beneath the tapered surface, and a final alignment ring having a rounded nose and tapered walls with a circular base of enlarged diameter, with the diameter of the tapered portion being slightly larger than that of the cylindrical portion, whereby a stamping dropped over such mold part will be roughly aligned horizontally by engaging the first tapered surface and will be approximately centered by the cylindrical surface, and will subsequently receive final alignment by engaging the tapered wall surfaces of the annular base ring extending upwardly from the cavity floor.

The exact manner in which the foregoing and other advantages and objects are attained in practice will become more clearly apparent when reference is made to the following detailed description of the preferred embodiments of the invention set forth by way of example and shown in the accompanying drawings, wherein like reference numerals indicate corresponding parts throughout.

BRIEF DESCRIPTION OF THE DRAWINGS

FIG. 1 is a vertical sectional view, with a portion broken away, showing the details of a typical oil seal made with the method and apparatus of the invention;

FIG. 2 is a vertical sectional view of a molding apparatus according to the invention, showing two movable mold parts in the open position, and showing insertion and positioning of a seal casing in the mold;

DESCRIPTION OF THE PREFERRED EMBODIMENTS OF THE INVENTION

Figure 3:
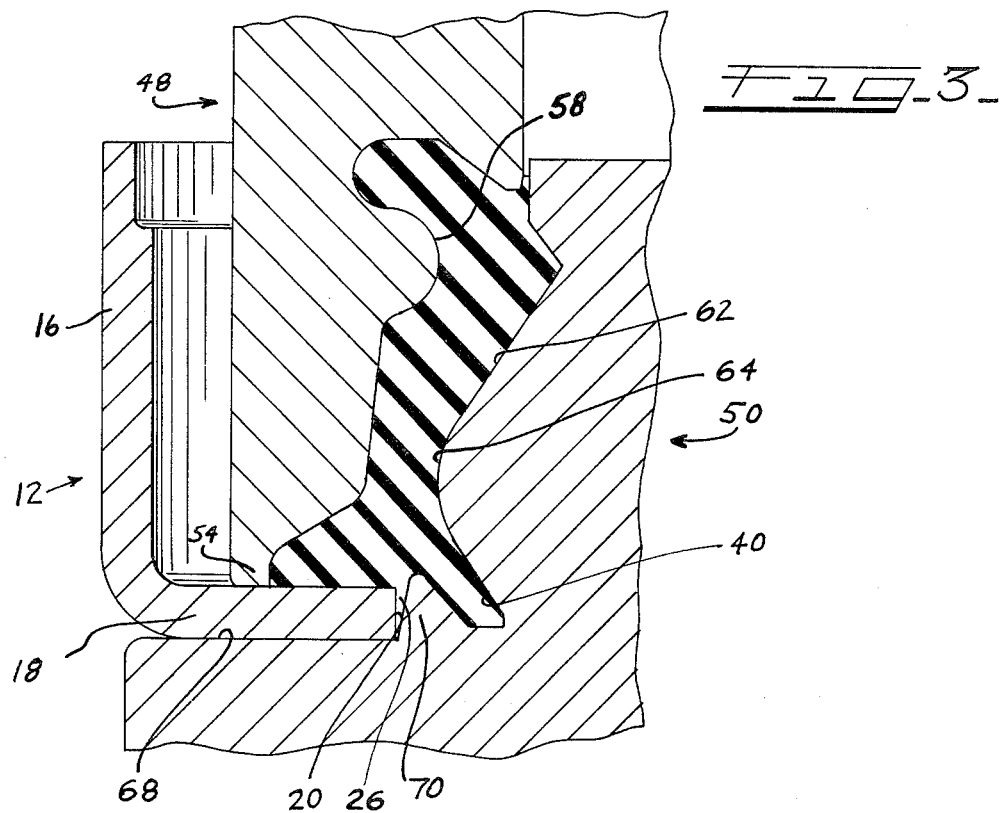
FIG. 3 is a vertical sectional view of the mold of FIG. 2 in the closed position thereof.

In the following description, it will be understood that the apparatus is intended to locate and properly center stampings inserted into the mold cavity and falling from their inserted position into the final position under the influence of gravity. Accordingly, expressions such as "up" and "down," etc., are used with the understanding that the mold opens and closes along a vertical axis, and that the stamping moves vertically as shown in FIG. 2 during the process of being positioned for molding.

Referring now to the drawings in greater detail, the invention is concerned primarily with methods and apparatus for making insert molded articles, such as oil seals, one of which is generally designated 12 and a flexible seal body portion generally designated 14. The casing 12 includes an axial flange 16, and a radial flange 18 terminating at an axially extending, annular heel surface 20.

The seal body 14 is generally made from an elastomeric material such as synthetic or natural rubber and includes a foot portion 22 bonded along an inner surface 24 of the flange 18 near the inside diameter thereof, with a small web 26 of elastomer also extending along the heel surface 20 of the casing 12 and being bonded thereto. The seal body 14 includes a primary sealing lip 28 defined by the junction of air side and oil side frusto-conical surfaces 30,32.

The diameter of the dirt lip 38 as molded is generally somewhat larger than that of a primary seal lip 28, inasmuch as the dirt lip is not as flexible and need not perform the same function of sealing liquids. As pointed out elsewhere herein, this lip functions only to exclude dirt from the primary seal area and often operates under dry or nearly dry conditions. FIG. 1 also shows that a small ring 44 of elastomeric material, sometimes called the "tear trim area," may exist on the oil side 32 of the seal body 14 where rubber entered the cavity during molding.

Referring now to FIG. 2, a seal mold generally designated 46 includes an upper mold half 48 and a lower mold half generally designated 50. The upper part 48 includes an annular foot 52 having a flat surface 54 adapted to engage the inside surface 24 of the stamping flange 18. The upper mold half 48 also includes an inwardly directed surface 56 including a land 58 which defines the spring groove 36 in the seal body 14 (FIG. 1).

Referring now to the lower mold half 50, this element includes outwardly directed surfaces including a lip forming groove 60, and a tapered, frusto-conical section 62 which increases in diameter as it extends downwardly. A generally vertically extending, cylindrical or nearly cylindrical surface 64 lies below the surface 62. A plurality of other mold surfaces define the dirt lip-forming groove 66.

The horizontally extending floor surface 68 of the lower mold half 50 includes an annular casing-locating ring 70 having a rounded nose portion 72 and outwardly tapering walls 74.

As shown in FIG. 3, when the mold halves 48, 50 are in a closed position, the foot 54 of the upper mold half 48 tightly engages the radial flange 18 of the stamping 12, thereby establishing a flash barrier to prevent escape of fluent elastomer from the mold. Depending upon the forces applied thereto, the foot 52 may actually coin or form a slight indentation or groove in the radial metal flange 18. Forces thus applied to the flange 18 also creates a flash barrier beneath the flange 18 by holding it in tight contact with the floor 68 of the mold half 50. FIG. 3 shows that a thin tab or membrane 26 is formed radially outwardly of the annular locating ring 70.

Although the present invention is shown to utilize molds wherein the rubber is moved into the molding cavity by reason of mold part closure (compression molding), the principles thereof also supply to molds which may be closed completely before rubber is moved into the cavity, such as occurs in transfer or injection molding.

FIG. 3, which is shown on a greatly enlarged scale, shows that there is very little clearance between the heel portion 20 of the stamping flange 18 and the ring 70, and that, because of the tapered wall 74 of the ring 70, the casing 12 will be almost exactly centered in relation to the mold, within the tolerances which are permissible from a quality standpoint and which still permit clearance enough to avoid wedging the stamping in the mold. In a typical embodiment, the space between the surface 20 and the bottom of the wall 74 is 0.002 to 0.005 inches, and in practice, this space is almost always found to be uniform throughout the circumference of the wall 74.

Figure 4:
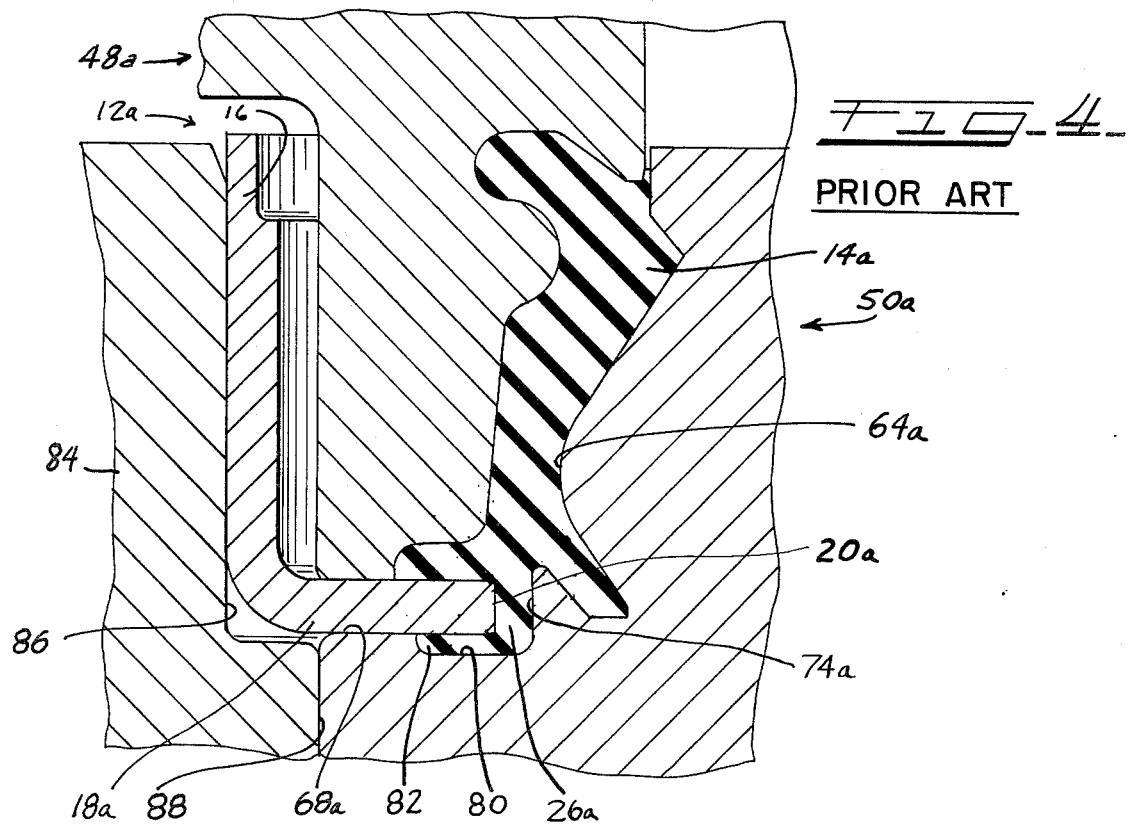
FIG. 4 is a vertical sectional view of a prior art apparatus and showing certain features thereof.

By contrasting the construction of FIG. 3 with that of FIG. 4, some of the differences between the invention and the prior art may be easily seen. Thus, in FIG. 4, an upper mold half 48a is shown to cooperate with a lower mold half 50a to form a seal having a casing portion 12a and an elastomeric seal body 14a. In the prior art construction shown in FIG. 4, however, the lower mold half 50a contains an annular groove 80 in which is formed a rubber heel tab 82 on the radial flange portion 18a of the stamping 12a. A rubber web 26a of significant thickness lies between the wall 74a and the heel 20a of the stamping 12a.

The wall 74a is vertical, and it does not adjoin the floor 68a of the lower mold 50a adjacent the heel 20a of the stamping or casing 12a. Because of the radial space occupied by the web 26a, the radial flange 16 of the stamping 12a must be engaged on its outer diameter by a centering ring or plate 84 having inner surfaces 86 which engage the axial flange 16. In these prior art constructions for each seal having a different outside diameter size, a separate centering plate or ring 84 must be provided, and this ring must have an indexing surface 88 or its counterpart in order to engage the lower mold half 50a or other element which may be used to establish the intended axial center line of the finished part.

In seals made according to the present invention, the mold surface 64 is of larger diameter than its counterpart 64a in the prior art, and is more cylindrical than its counterpart, in order to effect preliminary centering of the heel or inside diameter 20 of the stamping, as brought out elsewhere herein.

Referring now to the operation of the molding apparatus of the invention, it will be assumed that the mold is in the open position and that a casing 12 is being positioned within the mold. As shown in FIG. 2, in which the upper mold half 48 is shown somewhat lowered for clarity, the casing 12 is inserted and allowed to drop freely towards the floor surface 68 of the lower mold half 50. If, by chance, the casing 12 is dropped vertically from an exactly centered position, it may well descend directly to the floor of the lower mold part 50 and remain there to await mold closure. However, such occurrences almost never happen, and in normal use, as the stamping descends, the tapered surface 62 engages the heel or axial inside surface 20 of the stamping 12 at a particular point around the inner diameter thereof. This roughly guides the stamping toward a more centered position, and eliminates initial cocking. As the stamping continues to move downwardly, it rides along the surface 62 and next engages the surface 64, which has a significant vertical extent and which is preferably somewhat cylindrical in cross section at this point. Contact between the surface 20 and the surface 64 creates relatively fine centering of the stamping 12, because the relation between the height of the surface 64 and the extent of the surface 20 surface tends to align the casing in a substantially horizontal position. During this contact, the forces of gravity cooperates with this unique shape to continue moving the casing vertically until, assuming it still remains slightly off-center, one point along its innermost edge will engage the rounded or transition nose surface 72 on the centering ring 70. Thereupon, the tapered wall 70 will perform a final alignment function on the inside diameter of the stamping or casing 12.

The present invention is not intended to be limited to any particular theory or mode of operation, and the reasons for the successful operation of the apparatus are not understood with certainty. However, it is believed possible that the unusual combination of the upper tapered surfaces on the center post with a generally cylindrical alignment surface disposed therebelow, and the provision of a final alignment ring having a rounded nose and a tapered outside wall, combine with the tendency of the casing itself to pivot into a flat position each time a lower part thereof is arrested by contact with one or more of the surfaces 62, 64, 74, or with the floor surface 68, accounts for the uniquely successful self-centering action provided by the invention. The preliminary alignment surfaces 62, 64 are apparently able to center the somewhat resilient, light-weight metal stampings 12 sufficiently so that their final descent is accurately controlled by the centering ring. If one edge of the stamping flange 18 strikes the floor surface 68, the heel of the opposite edge is pivoted out by the surfaces 62, 64 so that the edge will subsequently engage and be guided by the surfaces 72 and 74. If the stamping is aligned precisely enough to drop straight down, the clearance between the surface 20 and the surface 74 is such that the casing will then remain aligned or will be able to be aligned by final contact with the surface 74.

In use, molds made according to the present invention have centered stamping fed to the mold within tolerances of within a few thousandths of an inch repeatedly and without any difficulty. Molds made in this way are more economical in operation and in initial costs, since centering plates need not be provided. Moreover, eliminating centering plates in some cases enables a given platen area to accommodate a greater number of molding cavities than would be the case if centering plates were provided.

According to the invention, dimensioning of the floor 68 and the tapered centering ring wall 74 in the manner shown provides good centering action without creating binding or interference between the inside diameter 20 of the stamping 14 and the wall 74. The invention provides a very small but definite space between the bottom of the wall 74 and the inside diameter of the stamping so that, even on those stampings having the smallest inside diameters within tolerances, the stamping is not undesirably wedged or jammed into the centering ring wall as would be the case if no floor surface 68 were provided. The present invention thus provide a combination of a centering action which is accurate enough to produce commerically acceptable precision ports, while also providing a construction wherein interference or other complete circumferential physical contact between the inner diameter of the stamping and the centering ring is not present, thereby facilitating removal of the finished article from the mold.

It will thus be seen that the present invention provides a novel seal molding apparatus and method, said apparatus and method having a number of advantages and characteristics, including those referred to specifically herein, and others which are inherent in the invention. It is anticipated that, a representative embodiment only having been shown by way of example, various modifications and changes to the method and apparatus described will occur to those skilled in the art, and such changes may be made without departing from the spirit of the invention or the scope of the appended claims.

I claim:

1. An apparatus for manufacturing fluid seals, said apparatus including first and second mold parts movable along a given axis between open and closed positions, one of said parts having at least one radially extending substantially flat mold surface adapted to receive and support one surface of the radial flange portion of an insert to which a molded part of the seal is to be bonded, and the other part including at least one portion adapted to engage an opposite surface of said flange to hold said flange against said receiving and supporting mold surface to prevent leakage of fluid material from said cavity along said flange, a plurality of seal body-forming surfaces on one of said mold parts, including at least one upper frusto-conical surface adapted to form one surface of the primary lip of said seal, a second seal body-forming surface of generally cylindrical form lying beneath said upper surface and joined thereto by a smooth transition portion, a lower frusto-conical surface tapering inwardly and downwardly and defining one surface of a second seal lip spaced axially from said primary lip, and an insert centering ring spaced downwardly apart from said cylindrical surface and radially outwardly of said lower frusto-conical surface, said centering ring having a rounded nose portion slightly greater diameter than the diameter of said cylindrical surface, and a wall surface extending downwardly and outwardly from said nose portion and joined to said flange receiving and supporting surface, the largest diameter of said centering ring being just smaller than the inside diameter of the flange of said insert, whereby said insert, when allowed to fall freely into said mold, is centered by successive contact between its inside diameter and said first tapered surface, said cylindrical surface, and said centering ring wall surface.

2. An apparatus as defined in claim 1 in which the largest diameter of said centering ring wall is sized so as to be spaced about 0.004 to 0.008 inches from said inside diameter of said insert.

3. An apparatus as defined in claim 1 wherein the diameter of said centering ring wall surface, at a point adjacent said rounded nose portion thereof, is about 0.010 to about 0.025 inches larger than the diameter of said cylindrical surface.

4. An apparatus as defined in claim 1 wherein the axial extent of said generally cylindrical surface is from about 0.030 to about 0.065 inches, said surface having an outward and downward taper of from 0° to not more than about 15°.

* * * * *

UNITED STATES PATENT OFFICE
CERTIFICATE OF CORRECTION

Patent No. 3,988,091     Dated  October 26, 1976

Inventor(s)  Jerry D. Reichenbach

It is certified that error appears in the above-identified patent and that said Letters Patent are hereby corrected as shown below:

Column 1, Line 3, the word "isert" should read --insert--

Column 4, Line 56, the word "supply" should read --apply--

Column 8, Line 1, after the word "portion" insert the word --of--

Signed and Sealed this

Seventeenth Day of May 1977

[SEAL]

Attest:

RUTH C. MASON
*Attesting Officer*

C. MARSHALL DANN
*Commissioner of Patents and Trademarks*